United States Patent
Delmer et al.

(10) Patent No.: US 6,796,493 B2
(45) Date of Patent: Sep. 28, 2004

(54) DEVICE FOR READING AND COLLECTING MEDIA WHICH CAN BE READ WITHOUT CONTACT

(75) Inventors: Philippe Delmer, Paris (FR); Peter Harlow, Gillingham (GB)

(73) Assignee: Thales, Paris (FR)

(*) Notice: Subject to any disclaimer, the term of this patent is extended or adjusted under 35 U.S.C. 154(b) by 0 days.

(21) Appl. No.: 10/311,852
(22) PCT Filed: Jun. 26, 2001
(86) PCT No.: PCT/FR01/02018
§ 371 (c)(1),
(2), (4) Date: Jul. 2, 2003
(87) PCT Pub. No.: WO02/01492
PCT Pub. Date: Jan. 3, 2002

(65) Prior Publication Data
US 2004/0026505 A1 Feb. 12, 2004

(30) Foreign Application Priority Data
Jun. 27, 2000 (FR) .............................. 00 08274

(51) Int. Cl.⁷ .............................................. G06F 17/60
(52) U.S. Cl. .................................................... 235/379
(58) Field of Search ................................ 235/378–382, 235/375, 449, 487, 492–493, 475, 440–441; 705/13; 902/15, 23–25

(56) References Cited
U.S. PATENT DOCUMENTS

| 4,348,656 | A | * | 9/1982 | Gorgone et al. | 382/135 |
| 4,361,754 | A | * | 11/1982 | Hoskinson et al. | 235/381 |
| 5,038,022 | A | * | 8/1991 | Lucero | 463/25 |
| 5,317,137 | A | * | 5/1994 | Wilkins | 235/380 |
| 5,382,781 | A | * | 1/1995 | Inoue | 235/384 |
| 5,563,397 | A | * | 10/1996 | Fujimoto et al. | 235/441 |
| 5,594,233 | A | * | 1/1997 | Kenneth et al. | 235/492 |
| 5,635,696 | A | * | 6/1997 | Dabrowski | 235/449 |
| 6,003,762 | A | * | 12/1999 | Hayashida | 235/379 |
| 6,036,097 | A | * | 3/2000 | Harsock et al. | 235/475 |
| 6,162,122 | A | * | 12/2000 | Acres et al. | 463/29 |
| 6,176,426 | B1 | * | 1/2001 | Kanayama et al. | 235/449 |
| 6,491,216 | B1 | * | 12/2002 | May | 235/375 |
| 2004/0035929 | A1 | * | 2/2004 | Okada | 235/438 |
| 2004/0089723 | A1 | * | 5/2004 | Moriya | 235/475 |

* cited by examiner

Primary Examiner—Thien M. Le
Assistant Examiner—Edwyn Labaze
(74) Attorney, Agent, or Firm—Lowe Hauptman Gilman & Berner, LLP

(57) ABSTRACT

This device comprises:
- an entrance (3) allowing a token (1) to be inserted into the reading and collecting device;
- a radio transmitting-receiving circuit (5) placed so that it can read a token (1) in an area (2) upstream of the entrance (3) of the device, such that a token (1) can be read before it is inserted into the entrance (3);
- a flap (11c) for preventing a token being inserted into the entrance (3) of the reading and collecting device when this medium is not recognized as valid on reading;
- a container (7) for collecting the tokens which are recognized as valid by the reading means (5, 6).

20 Claims, 1 Drawing Sheet

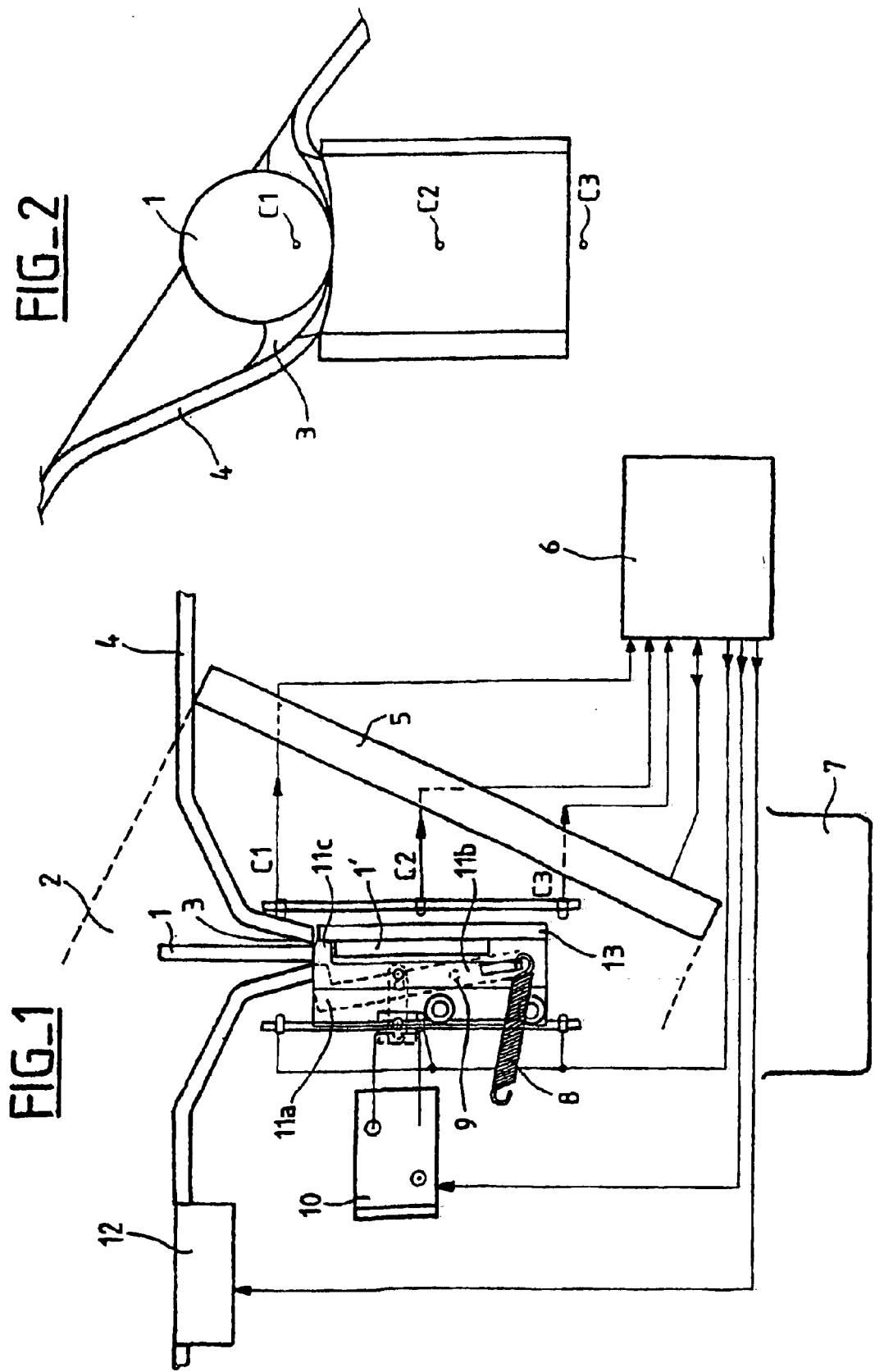

DEVICE FOR READING AND COLLECTING MEDIA WHICH CAN BE READ WITHOUT CONTACT

FIELD OF THE INVENTION

The invention relates to a device for reading and collecting media which can be read without contact. Typically this medium is a token which can be read and written to without contact via a radio link, but the invention is applicable to all media which can be read without contact, in particular a microcircuit card ("smart card").

BACKGROUND OF THE INVENTION

A contact-free token or card is able to communicate at a short distance (around ten centimeters) with a coupler provided with an antenna, for all functions such as writing, reading, authentication, etc. Usually, this medium also receives the power needed for its operation via this antenna. This type of remote communication is in the process of standardization according to the ISO 14443 standard. A smart card which can be read and written to via a radio link may further have means capable of being read by a contact method, namely magnetic reading, optical reading or electrical reading, so that it can also be read and written to by contact readers, that is to say requiring insertion into a machine.

The device according to the invention is more particularly intended to be used in the field of ticketing for transport. It will be described for this field, but other fields can be envisioned, in particular automatic dispensing. Ticketing systems for public transport have evolved over several years from conventional ticketing to the use of contact-free tokens or smart cards. However, the cost of these contact-free tokens or cards (several hundred times the price of a paper ticket with a magnetic strip) leads to these media being recovered and reused. When the user enters the transport network using a ticket valid for a single journey, the medium for this ticket is read without insertion into a machine, by virtue of the contact-free reading. When the user leaves the transport network, he has to insert the medium into a terminal for a gate to open. The inserted medium is read by a reader in order to check its validity, and it is collected by this terminal if it is a valid ticket; otherwise, it is rejected and returned to the user. If it is a ticket that is valid for several journeys, it is only collected when its value becomes zero. It is then revalidated by a new writing operation, then resold. Thus it can be reused several hundred times.

The device for collecting media must only collect valid media since only these can be recycled. The invalid media must be returned to the users who have inserted them into the reading and collecting device. Devices for reading and collecting media which can be read without contact are known which operate in a similar manner to an automatic vending machine using coins, with regard to the treatment of invalid media. The user is invited to insert the medium into an inlet orifice. The medium drops into a reader which determines whether or not it is valid, and which controls an electromechanical router. Depending on the case, the medium then drops into a basket for collecting valid media, or into a chute which takes it to an outlet orifice where the user can pick it up.

The dual circuit downstream of the router occupies a not insignificant volume. Furthermore, the orifice for returning the invalid media is necessarily lower than the reader since gravity is used to bring the medium toward the outlet orifice. However, this orifice should not be very low, so that the user does not have to bend down. The design of a pay terminal having such a reading and collecting device is therefore tricky.

SUMMARY OF THE INVENTION

The aim of the invention is to provide a reading and collecting device which is simpler to produce than the known devices.

The subject of the invention is a device for reading and collecting media which can be read without contact, comprising:

an entrance allowing a medium to be inserted into the reading and collecting device;

reading means comprising a radio transmitting-receiving circuit for reading a medium;

means for collecting the media which are recognized as valid by the reading means; characterized in that the radio transmitting-receiving circuit is placed so that it can read a medium in an area upstream of the entrance of the device, such that a medium can be read before it is inserted into the entrance; and in that the collection means comprise means for preventing a medium being inserted into the entrance of the reading and collecting device when this medium is not recognized as valid by the reading means.

The device thus characterized is simple to produce since it does not have means for returning the invalid media, by virtue of the fact that the invalid tokens can never be inserted into the device. Since the radio transmitting-receiving means are placed so as to radiate in the area which is upstream of the entrance, they can read a token even before it is inserted into the entrance. The means for preventing the insertion block the entrance in the absence of a medium recognized as valid.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood and other characteristics will become apparent by means of the description below and the accompanying figures:

FIG. 1 shows schematically a front view of an exemplary embodiment of the device according to the invention;

FIG. 2 shows schematically a side view of this exemplary embodiment.

DETAILED DESCRIPTION OF THE INVENTION

This exemplary embodiment comprises:

a wall 4 made of a transparent plastic for the radiowaves used for the contact-free reading;

an entrance 3 fitted with a chute, so that a token 1 with contact-free reading can easily be inserted, by hand, into this entrance 3;

a control unit 6, mainly consisting of a microcontroller;

a radio transmitting-receiving circuit 5, connected to the control unit 6;

a flap 11c supported by a lever 11a, 11b pivoting about an axis 9, this lever having a first arm 11a which can be pulled over by a solenoid 10, and a second arm 11b which is pulled over by a spring 8 in order to return the flap 11c to the rest position, that is to say blocking the entrance 3;

three optical position sensors C1, C2, C3 which detect the presence of the token respectively in three positions:
in front of the entrance 3;
in a position referred to as the reinitialization position, where writing is carried out in order to reinitialize the value allocated to this medium in order to constitute a new ticket;
in a position referred to as the effective collection position, where the token passes when it drops after having been reinitialized;

a light and sound indicator 12 actuated by the control unit 6 when the token 1 presented in front of the entrance 3 is not recognized as valid.

The radio transmitting-receiving circuit 5 is placed so as to radiate in the area 2 which is upstream of the entrance 3, in order to be able to read a token even before it is inserted into the entrance 3; and so as to radiate also downstream of the entrance 3 so that it can reinitialize this token after it has been inserted into the entrance 3.

When the solenoid 10 is not powered, the first arm 11a of the flap 11c is in the rest position and the entrance 3 is closed. When the solenoid 10 is powered, it pulls the first arm 11a over to the working position and the entrance 3 is open; on the other hand, the second arm 11b recloses the passage between this second arm and a wall 13 which guides the token. The token 1' is then immobilized, until the solenoid 10 is no longer powered.

When a user presents a token 1 in front of the entrance 3, the sensor C1 detects its presence. The control unit 6 reads the token 1 by means of the circuit 5, due to the fact that it can radiate in the area 2, upstream of the inlet of the entrance 3.

If the token 1 is not recognized as valid by the control unit 6, the latter actuates the indicator 12 to inform the user that he cannot insert it into the entrance 3, and that he must therefore keep it.

If the token 1 is recognized as valid by the control unit 6, the latter powers the solenoid 10 in order to open the flap 11. The user inserts his token 1 into the entrance 3.

When the sensor C2 detects that a token 1' has arrived in the reinitialization position, the control unit 6 writes to the token 1' by means of the circuit 5, due to the fact that it can also radiate in the area downstream of the inlet of the entrance 3. When the reinitialization is completed, the control unit 6 stops powering the solenoid 10. The flap 11c again closes the entrance and its second arm 11b releases the token 1'. The latter then drops into a collection container 7. The sensor C3 detects the passage of the token 1' toward the container 7, and informs the control unit 6 thereof. It can then process a new token presented at the inlet of the entrance.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A device for reading and collecting media which can be read without contact, comprising:
   an entrance allowing a medium to be inserted into the reading and collecting device;
   a reader remotely located from the entrance including a radio transmitting-receiving circuit for reading a medium;
   means for collecting the media which are recognized as valid by the reading means;
   wherein the radio transmitting-receiving circuit is placed so that it can read a medium in an area upstream of the entrance of the device, such that a medium can be read before it is inserted into the entrance; and
   wherein the collection means comprise means for preventing a medium being inserted into the entrance of the reading and collecting device when this medium is not recognized as valid by the reading means.

2. The device as claimed in claim 1, wherein the means for preventing the insertion of a medium comprise:
   a flap blocking the inlet of the entrance;
   and an actuator controlled by the reading means, in order to open the flap only if a medium is recognized as valid.

3. The device as claimed in claim 2, further comprising means for immobilizing a medium in the device, in a position where it can be written to; and in that these means for immobilizing a medium are coupled to the means for preventing the insertion of a medium, such that the same operation again closes the entrance of the device and releases a medium which was immobilized in the position where it can be written to.

4. The device as claimed in claim 3, wherein the immobilizing means are located below the entrance such that the medium moves by gravity from the entrance to the immobilizing means.

5. The device as claimed in claim 1, further comprising means for indicating to the user that the medium that the user is preparing to insert is not valid, when this medium is not recognized as valid by the reading means.

6. The device as claimed in claim 1, further comprising means for detecting the presence of a medium in front of the entrance, and then for triggering an operation of reading the medium for the purpose of determining whether it is valid.

7. The device as claimed in claim 1, further comprising means for detecting the presence of a medium downstream of the entrance, and then for triggering an operation of writing to the medium.

8. The device as claimed in claim 1, further comprising means for detecting the effective collection of a medium.

9. The device as claimed in claim 1, wherein the medium is a token.

10. The device as claimed in claim 1, wherein the medium is a ticket.

11. The device as claimed in claim 1, wherein the entrance faces upwardly and the entrance has a chute.

12. The device as claimed in claim 1, further comprising reinitialization means to reinitialize the value of the medium in order to constitute a new ticket.

13. The device as claimed in claim 1, wherein a wall separates the radio-transmitting circuit from the medium.

14. The device as claimed in claim 13, wherein the wall is a transparent plastic.

15. A device for reading and collecting media which can be read without contact, comprising:
   an entrance into which a medium can be inserted;
   a reader remotely located from the entrance including a radio transmitting-receiving circuit for reading a medium;
   a control unit which determines that a medium read by the radio-transmitting means is valid;
   a flap located beneath the entrance which is moved by an actuator controlled by the control unit from a normally closed position not allowing the medium to enter the device and an open position when the control unit has determined that the medium is valid; and a collection unit for collecting the valid mediums which enter the device.

16. The device as claimed in claim 15, further comprising:

a first optical position sensor in front of the entrance;

a second position sensor where writing is carried out on the medium; and a third optical sensor where the medium drops after writing.

17. The device as claimed in claim 15, wherein the medium is a token.

18. The device as claimed in claim 15, wherein the medium is a ticket.

19. The device as claimed in claim 15, wherein the entrance faces upwardly and the entrance has a chute.

20. The device as claimed in claim 15, further comprising means for detecting the presence of a medium in front of the entrance and then for triggering an operation of reading the medium for the purpose of determining whether it is valid.

* * * * *